(12) United States Patent
Barker

(10) Patent No.: US 7,624,013 B2
(45) Date of Patent: Nov. 24, 2009

(54) WORD COMPETITION MODELS IN VOICE RECOGNITION

(75) Inventor: Simon Barker, Watertown, MA (US)

(73) Assignee: Scientific Learning Corporation, Oakland, CA (US)

( * ) Notice: Subject to any disclaimer, the term of this patent is extended or adjusted under 35 U.S.C. 154(b) by 771 days.

(21) Appl. No.: 10/938,749

(22) Filed: Sep. 10, 2004

(65) Prior Publication Data

US 2006/0058996 A1    Mar. 16, 2006

(51) Int. Cl.
*G10L 15/00* (2006.01)
(52) U.S. Cl. .................. 704/251; 704/225; 704/257
(58) Field of Classification Search .............. 704/251, 704/257, 255
See application file for complete search history.

(56) References Cited

U.S. PATENT DOCUMENTS

| | | | |
|---|---|---|---|
| 5,870,709 A | 2/1999 | Bernstein | |
| 5,875,428 A | 2/1999 | Kurzweil et al. | |
| 5,920,838 A | 7/1999 | Mostow et al. | |
| 5,999,903 A | 12/1999 | Dionne et al. | |
| 6,014,464 A | 1/2000 | Kurzweil et al. | |
| 6,017,219 A | 1/2000 | Adams, Jr. et al. | |
| 6,033,224 A | 3/2000 | Kurzweil et al. | |
| 6,052,663 A | 4/2000 | Kurzweil et al. | |
| 6,068,487 A | 5/2000 | Dionne | |
| 6,137,906 A | 10/2000 | Dionne | |
| 6,157,913 A | 12/2000 | Bernstein | |
| 6,188,779 B1 | 2/2001 | Baum | |
| 6,199,042 B1 | 3/2001 | Kurzweil | |
| 6,246,791 B1 | 6/2001 | Kurzweil et al. | |
| 6,256,610 B1 | 7/2001 | Baum | |
| 6,320,982 B1 | 11/2001 | Kurzweil et al. | |
| 6,435,876 B1 | 8/2002 | Chen | |
| 6,634,887 B1 | 10/2003 | Heffernan, III et al. | |
| 6,963,841 B2* | 11/2005 | Handal et al. | 704/270 |
| 7,146,319 B2* | 12/2006 | Hunt | 704/254 |
| 7,302,389 B2* | 11/2007 | Gupta et al. | 704/235 |
| 2004/0193408 A1* | 9/2004 | Hunt | 704/209 |
| 2004/0215445 A1* | 10/2004 | Kojima | 704/9 |
| 2004/0234938 A1* | 11/2004 | Woolf et al. | 434/353 |
| 2006/0069561 A1* | 3/2006 | Beattie et al. | 704/251 |
| 2006/0143008 A1* | 6/2006 | Schneider et al. | 704/251 |

OTHER PUBLICATIONS

Banerjee et al., "Evaluating the Effect of Predicting Oral Reading Miscues" Project Listen; retrieved from http://www-2.cs.cmu.edu/~listen/pdfs/Eurospeech2003_Evaluating_predicted_mis, 4 pages.

Mostow et al. "A Prototype Reading Coach that Listens"; retrieved from http://www-2.cs.cmu.edu/%7Elisten/pdfs/aaai94_online.pdf, 9 pages.

* cited by examiner

*Primary Examiner*—Daniel D Abebe
(74) *Attorney, Agent, or Firm*—Fish & Richardson P.C.

(57) ABSTRACT

A system and method relate to voice recognition software, and more particularly to voice recognition tutoring software to assist in reading development.

33 Claims, 9 Drawing Sheets affect = AE F EH K T

| Loose | Medium | Strict |
|---|---|---|
| | 33     66 | |
| AE | AE | AE |
| | AE F | AE F |
| | AE F EH | AE F EH |
| | AE    K T | AE    K T |
| | AE F    T | AE F    T |

WORD COMPETITION MODELS IN VOICE RECOGNITION

Reading software tends to focus on reading skills other than reading fluency. One component in developing reading fluency is developing decoding skills, comprehension, and vocabulary. Pronunciation can be used to determine when a user or child is struggling with one or more of decoding skills, comprehension, and vocabulary.

SUMMARY

According to an aspect of the invention, a method for recognizing speech patterns includes segmenting a word into a string of consecutive phonemes. The method also includes storing a plurality of sequences of the phonemes. At least one of the sequences omits at least one phoneme that is preceding a last one of the phonemes in the string and succeeding a first one of the phonemes in the string. The method also includes comparing an utterance with the plurality of sequences of phonemes and determining if a match exists between the utterance and a particular one of the sequences of phonemes.

Embodiments can include one or more of the following.

Storing a plurality of sequences of phonemes can include storing a complete sequence of all the phonemes for the word, storing a truncated sequence of phonemes for the word, and/or storing a sequence of phonemes associated with a mispronunciation of the word. The method can also include associating a correctness indication with at least some of the sequences of the phonemes. The method can also include determining an accuracy of the utterance based on the determined match and the correctness indication. The method can also include providing a plurality of levels wherein the correctness indication varies based on the level. The plurality of levels can include, for example, loose, medium, and strict.

According to another aspect, a method includes segmenting a word into a string of consecutive phonemes and categorizing the word according to predefined levels of pronunciation. The categorization includes associating certain ones of the sequences of phonemes with a pronunciation level for the word. The sequences can be different for the plurality of levels.

Embodiments can include one or more of the following.

The plurality of levels can include, for example, loose, medium, and strict pronunciation levels. The plurality of levels can be based on pronunciation of the words. The sequences of phonemes can include a complete sequence of phonemes for the word, a truncated sequence of phonemes for the word, and/or a sequence of phonemes for the word with at least one omitted phoneme. The words can include at least 3 phonemes.

According to another aspect, a speech-recognizing device can be configured to segment a word into a string of consecutive phonemes and store a plurality of sequences of phonemes. The sequences can include a sequence omitting at least one phoneme that is preceding a last one of the phonemes in the string and succeeding a first one of the phonemes in the string.

Embodiments can include one or more of the following.

The device can be configured to compare an utterance with the plurality of sequences of phonemes and determine if a match exists between the utterance and a particular one of the sequences of phonemes. The speech-recognizing device can be configured to store a sequence of all the phonemes for the word and/or truncated sequence of phonemes for the word. The speech-recognizing device can also be configured to associate a correctness indication with at least some of the sequences of the phonemes and determine an accuracy of the utterance based on the determined match and the correctness indication. The speech-recognizing device can also be configured to provide a plurality of levels and the correctness indication can vary based on the level.

According to another aspect, a device can be configured to segment a word into a string of consecutive phonemes. The device can also be configured to categorize the word according to predefined levels of pronunciation by associating certain sequences of the phonemes with a pronunciation level for the word. The sequences can be different for the plurality of levels.

Embodiments can include one or more of the following. The plurality of levels can include, for example, loose, medium, and strict pronunciation levels. The plurality of levels can be based on pronunciation of the words. The sequences of phonemes can include a complete sequence of phonemes for the word, a truncated sequence of phonemes for the word, and/or a sequence of phonemes for the word with at least one omitted phoneme. The words can include at least three phonemes.

According to another aspect, a computer program product is tangibly embodied in an information carrier, for executing instructions on a processor. The computer program product is operable to cause a machine to segment a word into a string of consecutive phonemes. The computer program product also includes instructions to store a plurality of sequences of the phonemes. At least one of the sequences omits at least one phoneme that is preceding a last one of the phonemes in the string and succeeding a first one of the phonemes in the string. The computer program product also includes instructions to compare an utterance with the plurality of sequences of phonemes and determine if a match exists between the utterance and a particular one of the sequences of phonemes.

The computer program product also includes instructions to cause a machine to store a sequence of all the phonemes for the word. The computer program product also includes instructions to cause the machine to store a truncated sequence of phonemes for the word. The computer program product also includes instructions to cause the machine to associate a correctness indication with at least some of the sequences of the phonemes and determine an accuracy of the utterance based on the determined match and the correctness indication. The computer program product also includes instructions to cause a machine to provide a plurality of levels. The correctness indication can vary based on the level.

According to another aspect, a computer program is tangibly embodied in an information carrier, for executing instructions on a processor. The computer program product is operable to cause a machine to segment a word into a string of consecutive phonemes. The computer program product also includes instructions to categorize the word according to predefined levels of pronunciation by associating certain sequences of the phonemes with a pronunciation level for the word. The sequences can be different for the plurality of pronunciation levels.

Embodiments can include one or more of the following. The plurality of levels can include, for example, loose, medium, and strict pronunciation levels. The plurality of levels can be based on pronunciation of the words. The sequences of phonemes can include a complete sequence of phonemes for the word, a truncated sequence of phonemes for the word and/or a sequence of phonemes for the word with at least one omitted phoneme. The words can include at least three phenomes.

DETAILED DESCRIPTION

Figure 1:
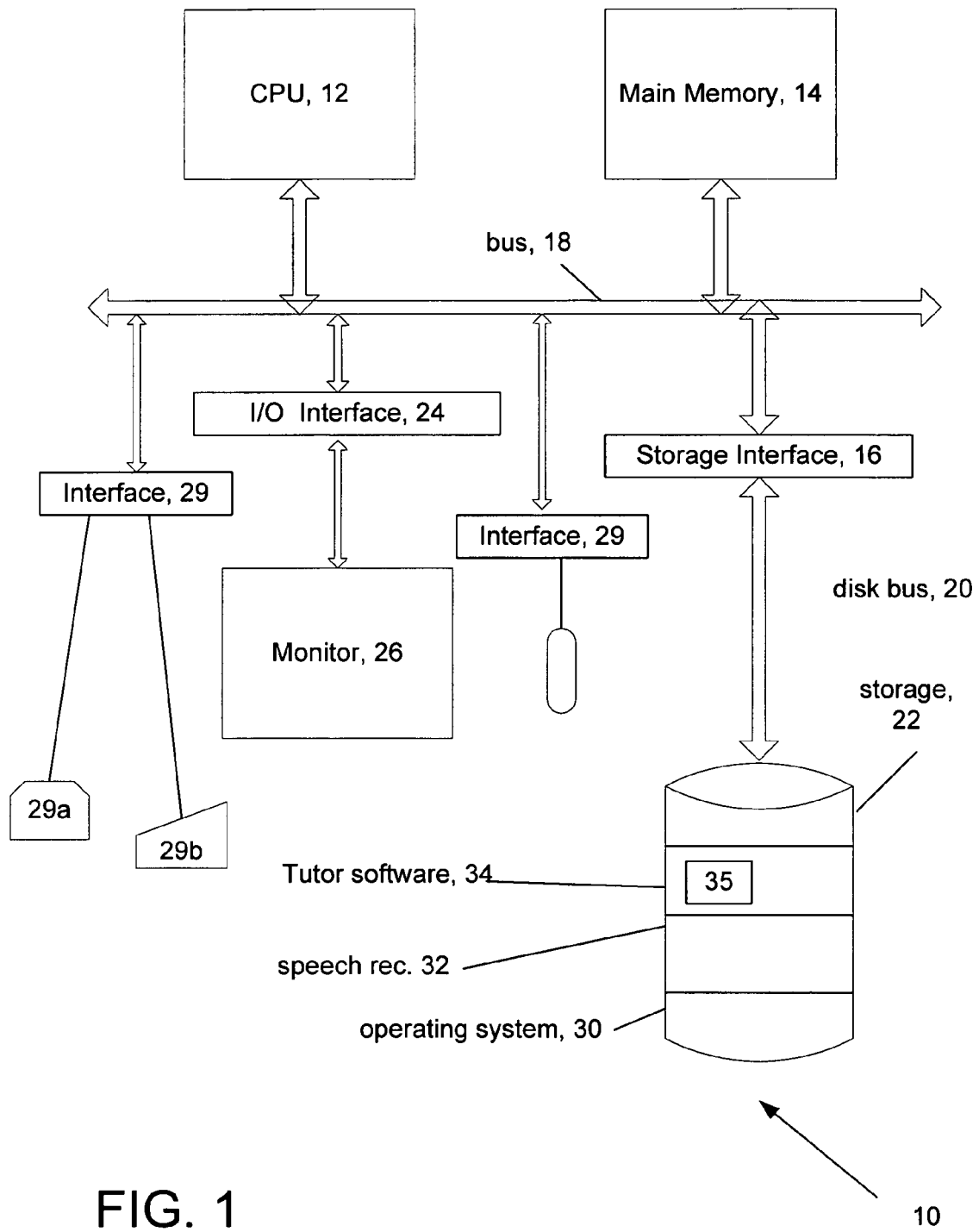
FIG. 1 is a block diagram of a computer system adapted for reading tutoring.

Referring to FIG. 1, a computer system 10 includes a processor 12, main memory 14, and storage interface 16 all coupled via a system bus 18. The interface 16 interfaces system bus 18 with a disk or storage bus 20 and couples a disk or storage media 22 to the computer system 10. The computer system 10 would also include an optical disc drive or the like coupled to the bus via another interface (not shown). Similarly, an interface 24 couples a monitor or display device 26 to the system 10. Other arrangements of system 10, of course, could be used and generally, system 10 represents the configuration of any typical personal computer. Disk 22 has stored thereon software for execution by a processor 12 using memory 14. Additionally, an interface 29 couples user devices such as a mouse 29a and a microphone/headset 29b, and can include a keyboard (not shown) connected to the bus 18.

The software includes an operating system 30 that can be any operating system, speech recognition software 32 which can be any speech recognition system such as the Sphinx II open source recognition engine or any engine that provides sufficient access to recognizer functionality and tutoring software 34 which will be discussed below. The reading tutor software 34 is useful in developing reading fluency and can include a word competition model generation unit 35 also described below. A user would interact with the computer system principally though mouse 29a and microphone/headset 29b.

Figure 2:
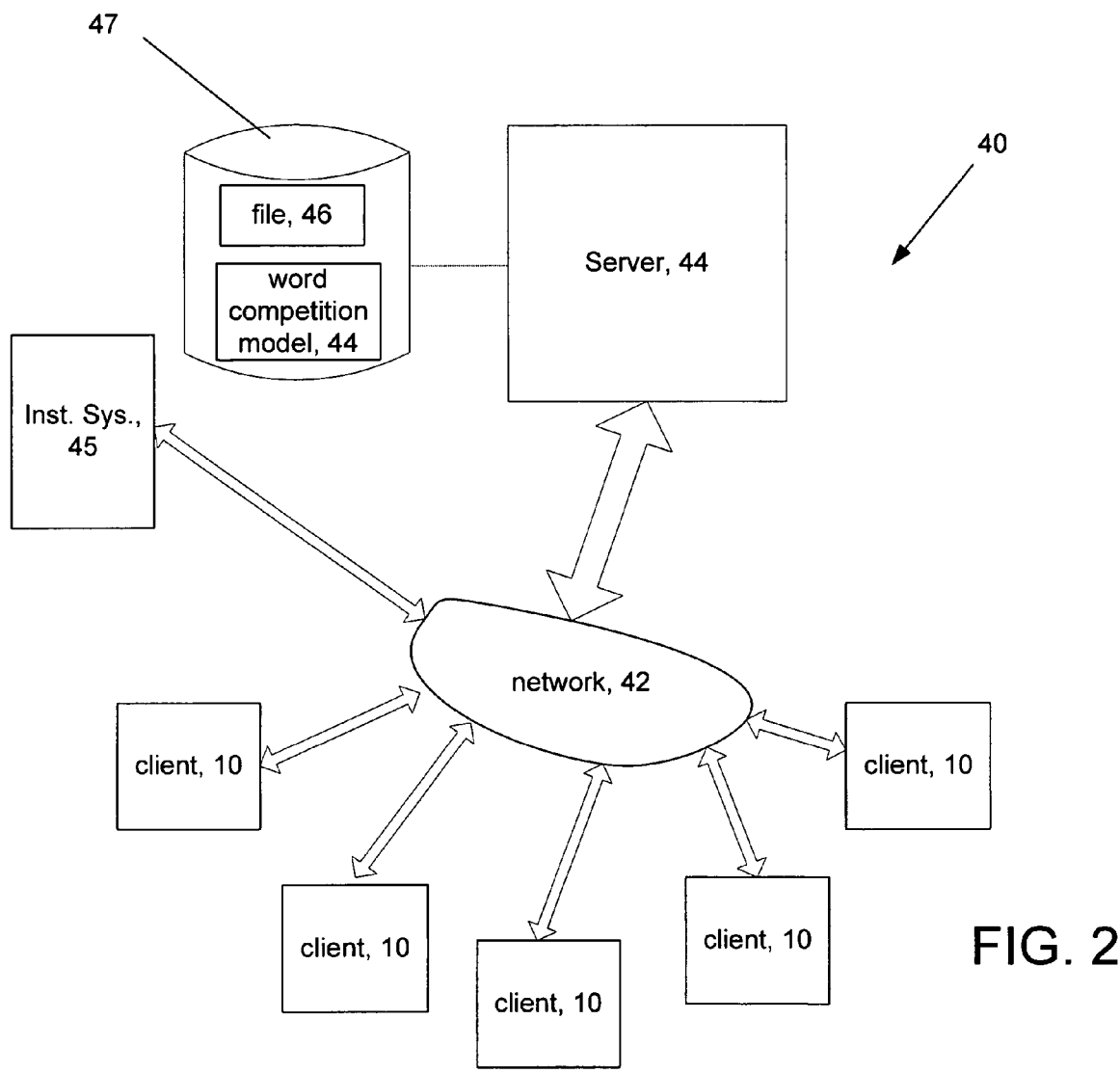
FIG. 2 is a block diagram of a network of computer systems.

Referring now to FIG. 2, a network arrangement 40 of such systems 10 is shown. This configuration is especially useful in a classroom environment where a teacher, for example, can monitor the progress of multiple students. The arrangement 40 includes multiple ones of the systems 10 or equivalents thereof coupled via a local area network, the Internet, a wide-area network, or an Intranet 42 to a server computer 44. An instructor system 45 similar in construction to the system 10 is coupled to the server 44 to enable an instructor and so forth access to the server 44. The instructor system 45 enables an instructor to import student rosters, set up student accounts, adjust system parameters as necessary for each student, track and review student performance, and optionally, to define awards.

The server computer 44 would include amongst other things a file 46 stored, e.g., on storage device 47, which holds aggregated data generated by the computer systems 10 through use by students executing software 34. The files 46 can include text-based results from execution of the tutoring software 34 as will be described below. Also residing on the storage device 47 can be individual speech files resulting from execution of the tutor software 34 on the systems 10 and word competition models 49. In other embodiments, the speech files being rather large in size would reside on the individual systems 10. Thus, in a classroom setting an instructor can access the text based files over the server via system 45, and can individually visit a student system 10 to play back audio from the speech files if necessary. Alternatively, in some embodiments the speech files can be selectively downloaded to the server 44.

Like many advanced skills, reading depends on a collection of underlying skills and capabilities. The tutoring software 34 fits into development of reading skills based on existence of interdependent areas such as physical capabilities, sensory processing capabilities, and language and reading skills. In order for a person to learn to read written text, the eyes need to focus properly and the brain needs to properly process resulting visual information. The person develops an understanding of language, usually through hearing language, which requires that the ear mechanics work properly and the brain processes auditory information properly. Speaking also contributes strongly to development of language skills, but speech requires its own mechanical and mental processing capabilities. Before learning to read, a person should have the basic language skills typically acquired during normal development and should learn basic phonememic awareness, the alphabet, and basic phonics. In a typical classroom setting, a person should have the physical and emotional capability to sit still and "tune out" distractions and focus on a task at hand. With all of these skills and capabilities in place, a person can begin to learn to read fluently, with comprehension, and to develop a broad vocabulary.

The tutor software 34 described below is particularly useful once a user has developed proper body mechanics and the sensory processing, and the user has acquired basic language, alphabet, and phonics skills. The tutor software 34 can improve reading comprehension, which depends heavily on reading fluency. The tutor software 34 can develop fluency by supporting frequent and repeated oral reading. The reading tutor software 34 provides this frequent and repeated supported oral reading, using speech recognition technology to listen to the student read and provide help when the student struggles. In addition, reading tutor software 34 can assist in vocabulary development. The software 34 can be used with persons of all ages and especially children in early though advanced stages of reading development.

Vocabulary, fluency, and comprehension interact as a person learns. The more a person reads, the more fluent the person becomes, and the more vocabulary the person learns. As a person becomes more fluent and develops a broader vocabulary, the person reads more easily.

Figure 3:
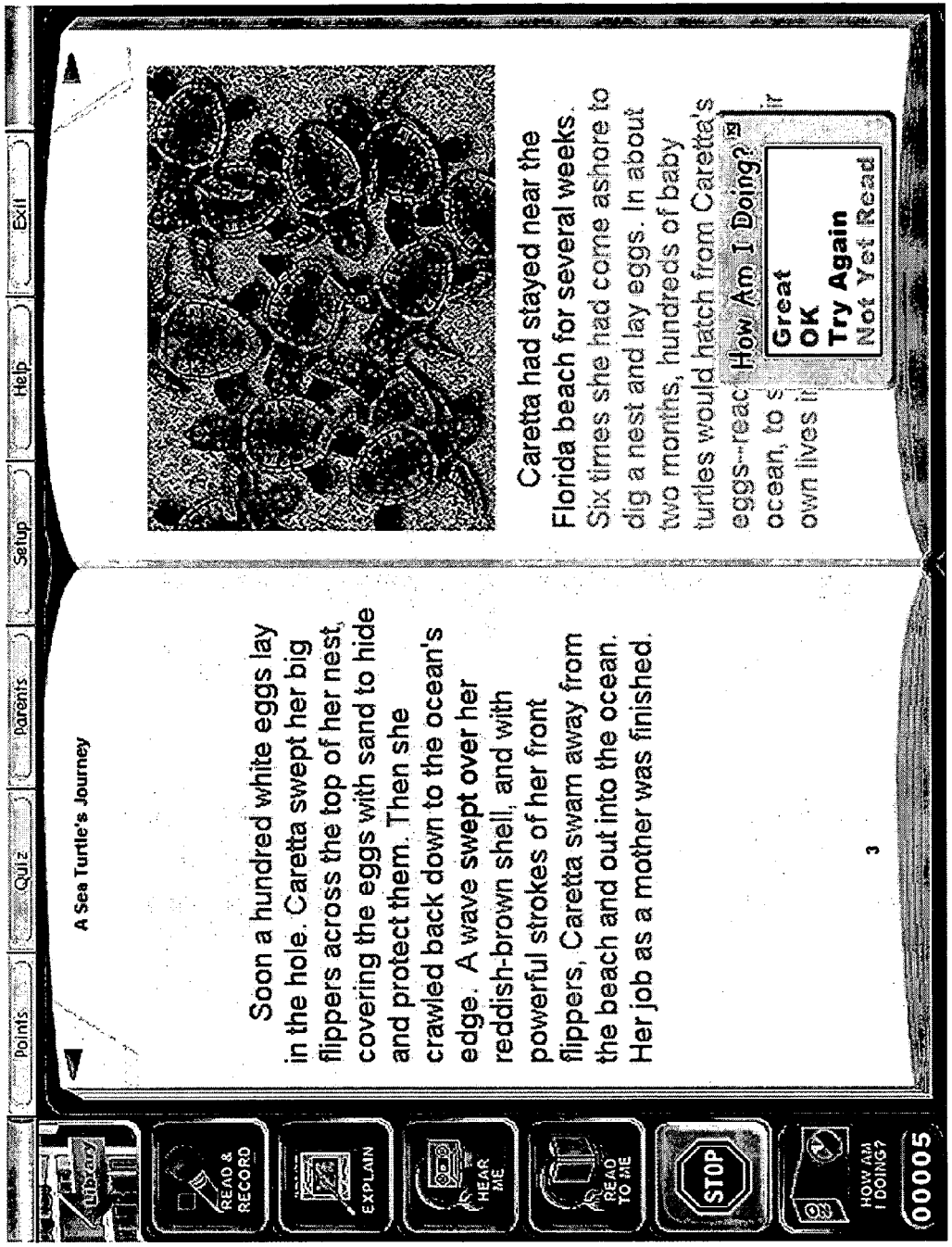
FIG. 3 is a screenshot of a reading passage.

Referring now to FIG. 3, the tutor software 34 includes passages that are displayed to a user on a graphical user interface (e.g., passages can be displayed on monitor 26). The tutor software 34 includes data structures that represent a passage, book, or other literary work. The words in the passage are linked to data structures and the pronunciation of a word can be evaluated based on the associated data structures for the word. The speech recognition software verifies whether a user's oral reading matches the words in the section of the passage the user is currently reading to determine a user's level of fluency. Other aspects of the user's reading may be used in addition to word verification to determine a level of fluency for a user.

When a user is reading a passage for the first time, when a user is struggling or having difficulty reading a passage, or when a user is reading a passage above their fluency level, the user may make pronunciation mistakes or other reading errors. Common mistakes in word pronunciation include incomplete pronunciation of a word (e.g., only pronouncing or uttering a portion of the word) and pronunciations omitting portions of the word (e.g., skipping interior portions of the word).

In order to provide an accurate assessment of a user's fluency, the speech recognition software recognizes both an accurate pronunciation and mispronunciations of words in a passage. If the speech recognition engine does not recognize pronunciation errors, the user may receive a high number of false positive indications. A false positive indication occurs when a user does not correctly pronounce the word, but the speech recognition software credits the user for a correct pronunciation. On the other hand, at times the recognizer may not recognize a correct pronunciation of a word. This is referred to as a false negative indication.

In speech recognition software 32, it can be desirable to reduce the number of false negatives and false positives to increase the accuracy of an assessment of a user's fluency. In order to reduce the number of incorrect words or partial words that the speech recognition system might confuse with the expected (e.g., correct) word, competition models representing the mispronunciations are included in the data structure representation of the dictionary in addition to a correct pronunciation for a word. Competition models generate competition in the speech recognizer to help the speech recognizer avoid incorrectly identifying mispronunciations as correct pronunciations. The competition models provide specific examples of ways in which the word might be mispronounced. The speech or audio recognizer matches the user's speech input to a correct pronunciation or to one of the word competition models that represent potential mispronunciations. If the user's reading input more closely matches one of the word competition models than the correct pronunciation, the speech recognizer notes that the user incorrectly pronounced the word.

Figure 4:
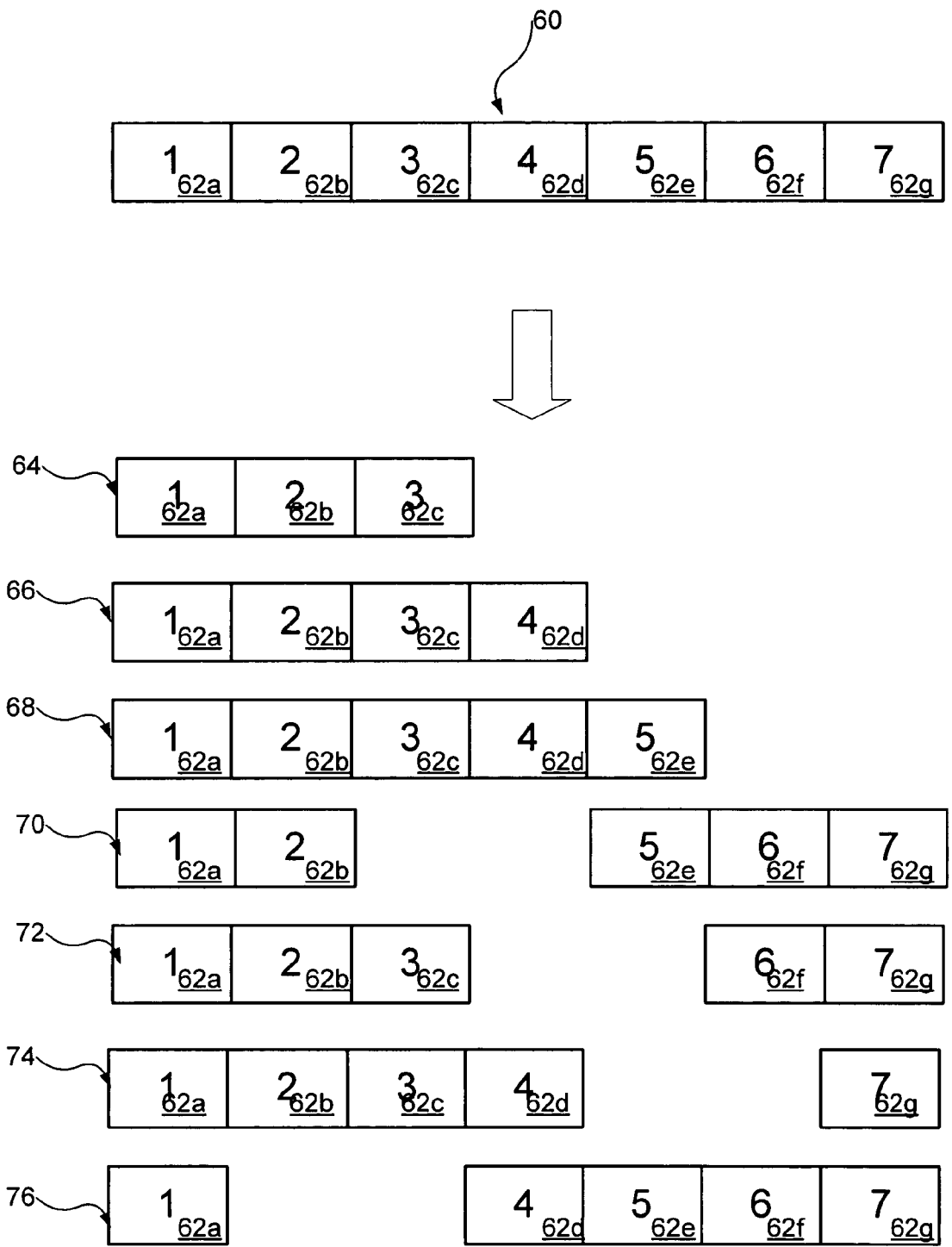
FIG. 4 is a block diagram depicting word competition models.

Referring to FIG. 4, examples of word competition models for a word 60 are shown. In this example, the word 60 is segmented into a sequence of phonemes 62*a*-*g* that comprise the word. A phoneme is a basic theoretical unit of sound capable of conveying a distinction in meaning or a unit of sound that can distinguish words (e.g., changing one phoneme in a word can generate a different word). The English language includes at least about 40 phonemes that can be used to represent different sounds. The number of phonemes as well as the sounds represented by the phonemes can vary depending on the language.

In order to generate competition models, the word 60 is represented by the sequence of phonemes that make up the word, as well as, different, incorrect combinations or sequences of phonemes that are stored as competition models. The competition models can be stored in, e.g., the dictionary data structure in addition to the correct pronunciation (e.g., all phonemes).

In the example shown in FIG. 4, word 60 includes a sequence of seven phonemes 62*a*-62*g*. The competition models 64, 66, 68, 70, 72, 74, and 76 represent different combinations or sequences of the phonemes associated with incorrect or partial pronunciations of the word 60. The competition models 64, 66, 68, 70, 72, 74, and 76 illustrate partial word or start word competition models and mid-word deletion competition models. The mid-word deletion models (e.g., models 70, 72, 74, and 76) store sequences of phonemes where at least one phoneme that precedes a last one of the phonemes in the sequence but succeeds a first one of the phonemes in the sequence is omitted from the model (e.g., sequences omitting an interior phoneme). The partial or start word competition models (e.g., models 64, 66, and 68) include truncated sequences of phonemes.

Other sequences or sets such as phoneme replacement competition models and additional phoneme competition models could also be included as competition models.

The partial or start word category includes combinations of phonemes (e.g., representations 64, 66, 68) associated with a user correctly beginning to pronounce the word, but stopping before completely pronouncing the word. Thus, the start word competition models include a first portion of the phonemes in the correct sequence for the word. For example, for the word "Mississippi" a combination of phonemes in the start word category could include a representation of the user saying only the first portion of the word such as "Miss."

The mid-word deletion competition models include combinations or sequences of phonemes (e.g., representations 70, 72, 74, and 76) that represent mispronunciations in which the first and last phoneme are correctly pronounced, but one or more intermediate phonemes are omitted. For example, for the word "Mississippi" a combination of phonemes in the mid-word deletion word category could include a representation of the user saying "Missippi."

In addition to the representation of a subset of phonemes for a competition model, the competition model can also have an associated probabilistic weighting. In order to define probabilistic weights to a subset of phonemes or expected words, a recognition configuration includes a set of items that can be recognized for an utterance, as well as the relative weighting of these items in the recognizer's search process. For example, the set of items may include a comparison of the audio to acoustic models for all items in the currently active set. The set of items that can be recognized may include expected words, for example, the words in the current sentence, words in the previous sentence, words in the subsequent sentence, or words in other sentences in the text. The set of items that can be recognized may also include the word competition models. The set of recognized sounds may also include phoneme fillers representing individual speech sounds, noise fillers representing filled pauses (e.g., "um . . . ") and non-speech sounds (e.g., breath noise).

The relative probabilistic weighting of these items may be independent of prior context (independent of what has already been recognized in the current utterance, and of where the user started in the text). For example, word recognitions may always be weighted more heavily (preferred over) recognition of phoneme fillers. The relative weighting of items may also be context-dependent, i.e. dependent on what was recognized previously in the utterance and/or on where the user was in the text when the utterance started.

The context-dependent weighting of recognition items is accomplished through language models. The language models define the words and competition models that can be recognized in the current utterance, and the preferred (more highly weighted) orderings of these items, in the recognition sequence. Similar to a statistical language model that would be used in large-vocabulary speech recognition, a language model defines the items (unigrams—a single word), ordered pairs of items (bigrams—a two word sequence), and ordered triplets of items (trigrams—a three word sequence) to be used by the recognition search process. It also defines the relative probabilistic weights of the unigrams, bigrams, and trigrams and this weighting is used in the recognition search process. Additionally, the language model defines the weights to be applied when recognizing a sequence (bigram or trigram) that is not explicitly in the language model.

The language model is defined as a set of probabilities, tri-gram, bi-gram and uni-gram probabilities. The weighting can be used to set a difficulty or skill level for the pronunciation correctness required to indicate a correct pronunciation. As the difficulty or skill level increases the probability of receiving a competition model increases relative to the probability of receiving the correct pronunciation. For example, sequence of words in the expected sentence might be A B C D E and the tri-gram, bi-gram and uni-gram probabilities in the language model can be defined for the n'th word, respectively as:

$p(w\_n|w\_n-1,w\_n-2)$, $p(w\_n|w\_n-1)$, and $p(w\_n)$.

The speech recognizer applies the probability models in the given order. For example, if a trigram sequence exists for the sequence A B C then the trigram probability $p(C|B,A)$ can be used in evaluation the likelihood that C follows B and A in the acoustic data. If the language model does not include such a probability model on the word sequence the recognizer will try $p(C|B)$ and should this exist the associated probability will be utilized but multiplied by a "back-off" penalty. Should $p(C|B)$ not exist within the model then $p(c)$ and a further back-off penalty will be applied. This probability should typically exist in the language model.

The prior probabilities for the expected word sequence can be set or determined to be equally probable, e.g., have a prior probability of 1. The "word competition models" for words, can be assigned to have smaller prior probabilities. If C_f is denoted as a word competition model for C, a set of prior probabilities is defined, the prior probabilities are determined by how phonetically close the word competition model is to the target word, and which difficulty setting has been selected by the user (e.g., loose, medium, or strict).

As described above, in addition to the context independent phones, two types of competition models include end of word phone deletions (EWD) and mid-word deletions (MWD). For example, to define the prior probabilities for the EWD in the medium difficulty setting five parameters are used.

Each parameter is assigned a discount or value that is used to derive prior probabilities for the word competition model. Exemplary parameters and values are shown below:

DIFF_TO_LONGEST_WORD COMPETITION MODEL 2
MINIMUM_WORD COMPETITION MODEL _LENGTH 1
STARTING_SUBWORD_WORD COMPETITION MODEL _MAX_DISCOUNT 3.0
STARTING_SUBWORD_WORD COMPETITION MODEL _MIN_DISCOUNT 1.6
STARTING_SUBWORD_WORD COMPETITION MODEL _DEC_DISCOUNT 0.5

Using the five parameters shown above, the 'MINIMUM_ word competition model _LENGTH' is the shortest allowable word competition model length in phones and the 'DIFF_ TO_LONGEST_word competition model' is the smallest difference in phones between the target word and the longest word competition model for that word. The values or discounts are used to derive prior probabilities for the word competition models.

For example, the longest word competition model is associated with the 'STARTING_SUBWORD_WORD COMPETITION MODEL_MAX_DISCOUNT'. Then for each word competition model in descending order of length an additional STARTING_SUBWORD_WORD COMPETITION MODEL_DEC_DISCOUNT is subtracted from the STARTING_SUBWORD_WORD COMPETITION MODEL_ MAX_DISCOUNT to get its penalty. However, if the resulting factor is <STARTING_SUBWORD_WORD COMPETITION MODEL_MIN_DISCOUNT, then that word competition model is given STARTING_SUBWORD_WORD COMPETITION MODEL_MIN_DISCOUNT as a prior probability.

The probabilities can vary based on the level of difficulty. For example, for a more strict setting the values could be as follows:

DIFF_TO_LONGEST_WORD COMPETITION MODEL 2
MINIMUM_WORD COMPETITION MODEL_ LENGTH 1
STARTING_SUBWORD_WORD COMPETITION MODEL_MAX_DISCOUNT 2.0
STARTING_SUBWORD_WORD COMPETITION MODEL_MIN_DISCOUNT 1.6
STARTING_SUBWORD_WORD COMPETITION MODEL_DEC_DISCOUNT 0.5

For the MWD word competition models, a single penalty (e.g., a common probability) is applied. This penalty can be dependent on the pronunciation setting. For example, the penalty for the intermediate could be set to 2.5 while the penalty for the strict setting could be set to 2.0.

The probabilities give the uni-gram, big-gram and tri-gram probabilities for each word competition model and associated word sequence. Back-off penalties can be similarly applied for real words. While particular values have been described in the examples above, other values or probabilities could be used.

In some embodiments, the probabilistic weights can be expressed as log 10 probabilities. For example, if the target word has a probability of 1, then the log 10 of a competition model word might be lower (e.g., −3.0). Thus, the system can weight the probability of receiving and recognizing a target pronunciation versus the competition models.

Figure 5:
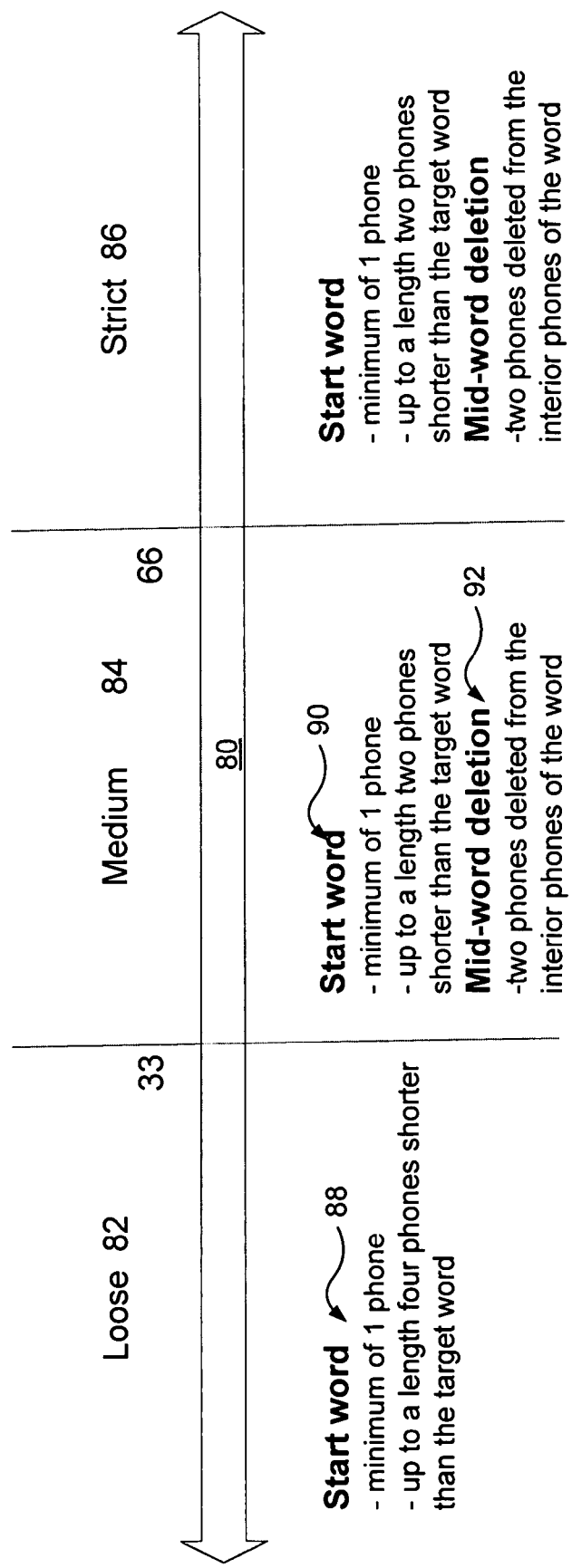
FIG. 5 is a diagrammatical view of a fluency bar and associated word competition models.

Referring to FIG. 5, an example of a method for generating competition models either automatically or manually and associating the models with different fluency or skill levels in the reading system is shown. In this example, a continuum 80 is divided into three levels "loose" 82, "medium" 84, and "strict" 86, however other divisions (e.g., equal or unequal divisions more or fewer divisions) are possible. The differing levels 82, 84, 86 can require different levels of pronunciation correctness for a user to be credited with a correct or incorrect pronunciation of a word. Thus, the strictness of the speech recognition increases as the difficulty level progresses from the left side of the continuum 80 to the right side of the continuum 80. A user may select a level on the continuum 80 associated with his/her level of presumed reading fluency or pronunciation. Alternately, the reading fluency system can automatically select and iteratively adjust the difficulty level according to audio received from the user.

In this example, the competition models differ based on the level of the continuum 80 such that there are fewer competition models associated with the loose category 82 than with the medium 84 and strict categories 86. The competition models can be based on a set of predefined rules such that the competition models can be automatically generated by the speech recognition system.

In this example, the loose level 82 includes only start word competition models 84. The start word competition models 88 for the loose level 82 are, e.g., a minimum of one phoneme in length and up to four phonemes shorter than the target word. In addition to the start word competition models included in the loose level 82, the medium level 84 includes start words competition model 90 represented by a truncated set of phonemes for the word. For example, a sequence of phonemes with up to two phonemes shorter than the target word. The medium level also includes a set of mid-word deletion competition models 92. The mid-word deletion competition models include sequences of phonemes with, e.g., two or more phonemes deleted from the interior phonemes of the word. Alternatively, mid-word deletion models could include sequences of phonemes with a single phoneme deleted from the interior portion of the word. In this example, the strict category 80 includes the same competition models as the medium category 84, however, the weighting factor is increased for the competition models in the strict category. Alternatively, different or additional competition models could be included for the strict category 86.

Figure 6:
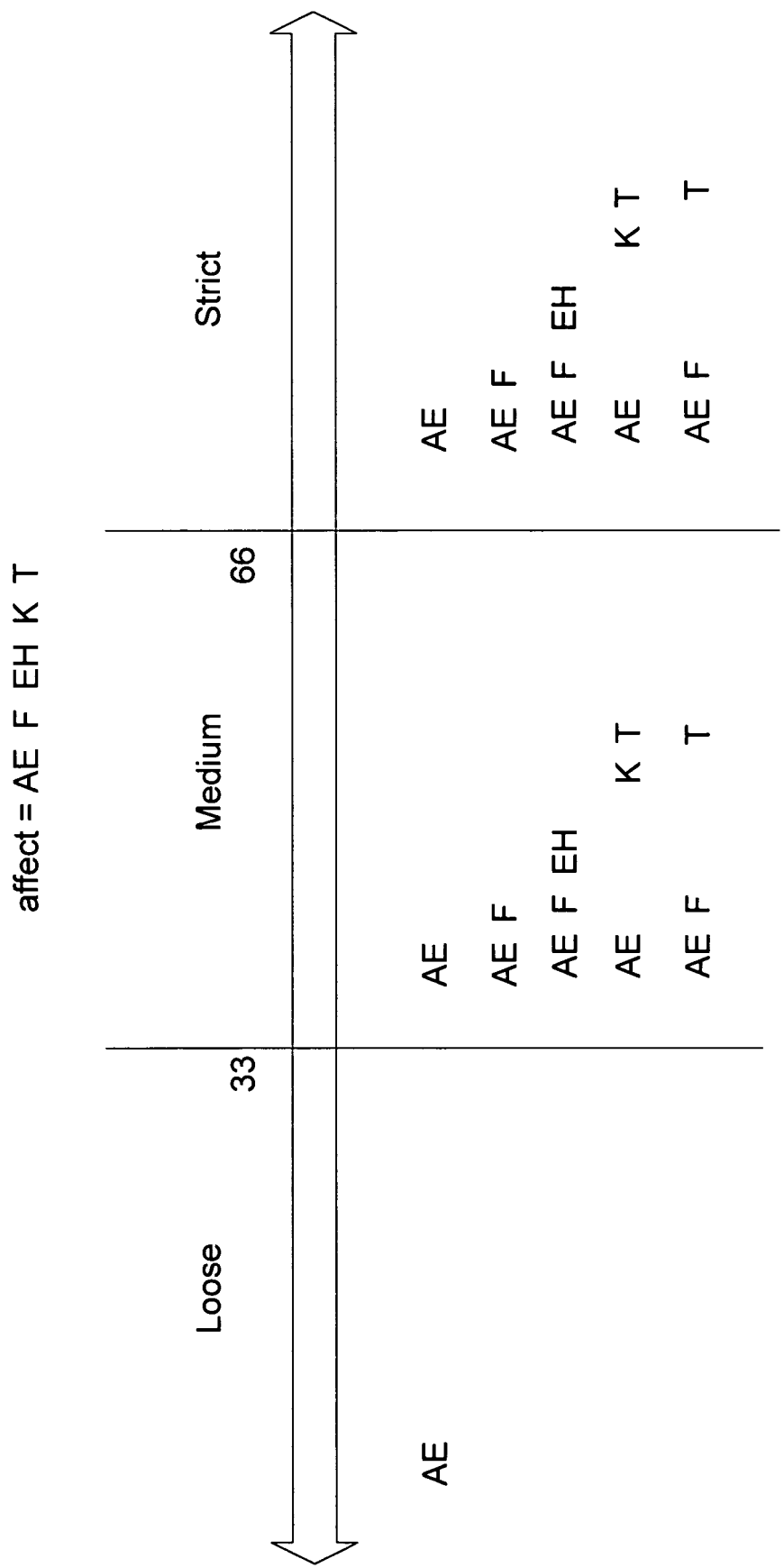
FIG. 6 is an example of a word and associated word competition models.

Referring to FIG. 6, an example of the competition models generated for the word "affect" using the guidelines described in FIG. 5 is shown. The word affect can be divided into a sequence of five phonemes /AE/ /F/ /EH/ /K/ /T/. Using this sequence of phonemes the competition models shown can be automatically generated by the speech recognition or tutor software.

As described above, probabilities can be assigned to each of the competition models. In the example shown in FIG. 6, the probability of receiving the word competition model for the single phoneme /AE/ will be lower than the probability of receiving the word competition model for a word competition model such as /AE/ /F/ /EH/.

For example, the probabilities for the intermediate setting could be set as follows:
AE 2.0
AE F 2.5
/AE/ /F/ /EH/ 3.0

As described above, the probabilities of receiving the different word competition models can vary based on the difficulty setting. For example, the probabilities for the intermediate setting could be set as follows:
AB 1.6
AE F 1.6
/AE/ /F/ /EH/ 2.0

Figure 7:
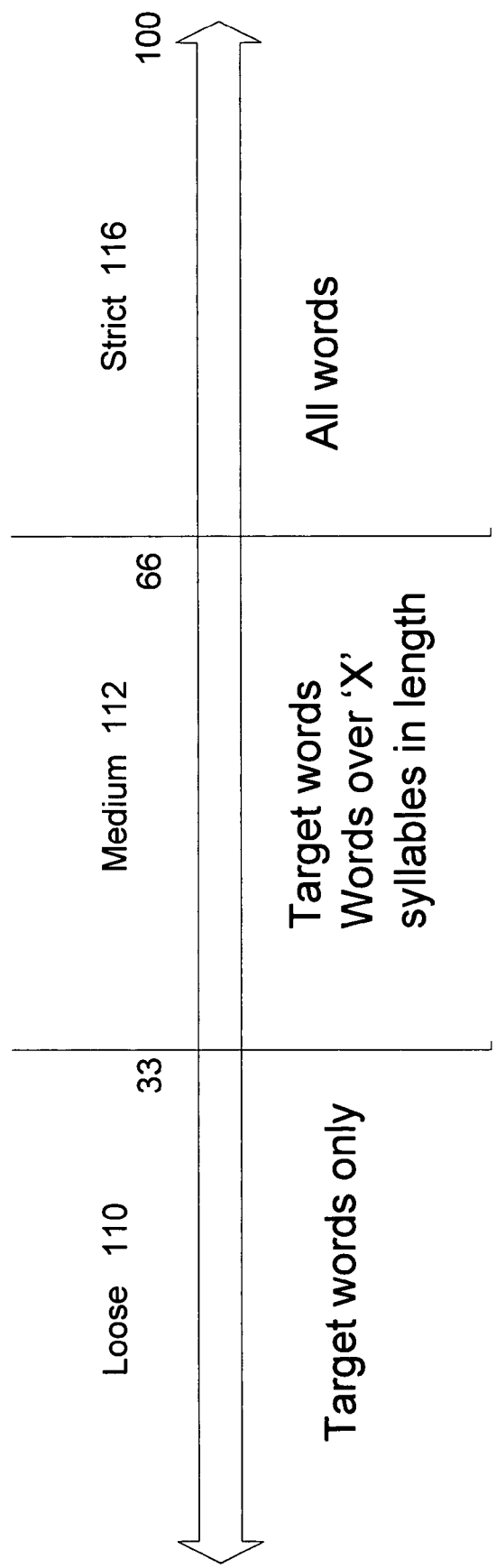
FIG. 7 is a diagrammatical view of a fluency bar and associated word competition models.

Referring to FIG. 7, another example of an association of different competition models with different levels is shown. In this example, the association of the competition models with different levels is not based on different rules for the deconstruction of the word into incorrect sequences of phonemes. Instead, the models associated with the levels are based on a categorization of the types of words in a passage. At the loose level 110, competition models are included only for words that are "target" words for a story or passage (e.g., words included in the glossary for the story or new words). The number of words for which the speech recognition system includes competition models increases as the difficulty level increases and the system requires a higher degree of pronunciation correctness. In this example, at the medium level 112 competition models are included for the target words and words over a predetermined number of syllables. At the strict level, all words or all words over a predetermined length have associated competition models. Other associations of competition models for the multiple levels can be used.

Figure 8:
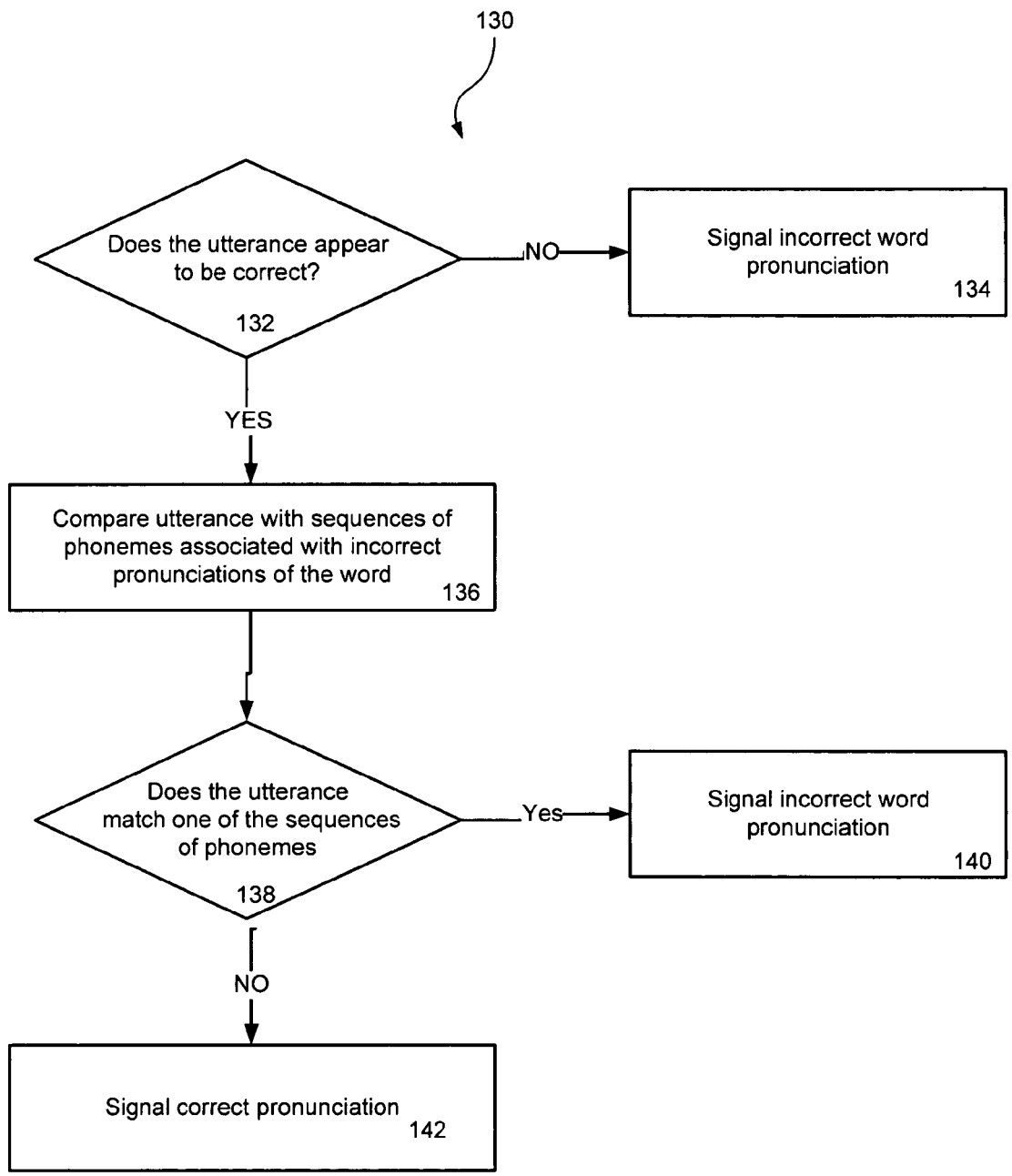
FIG. 8 is a flow chart depicting a technique to determine if a pronunciation is correct.

Referring to FIG. 8, a process 130 includes determining 132 whether an utterance received by the speech recognition software appears to have been pronounced correctly. If the utterance does not appear to be correct, process 130 signals 134 an incorrect pronunciation of the word. Process 130 decomposes the utterance into component phonemes and stores the phonemes. The component phonemes for the utterance are compared to a set of expected phonemes for the passage to determine if the utterance is correct. If the utterance appears to be correct (e.g., the expected phonemes match the component phonemes within a predetermined level of error or with a certain confidence level), the utterance is compared 136 to a set of competition models of incorrect combinations or sequences of phonemes associated with the word. Process 130 determines 138 if the utterance matches one of the competition models with a higher confidence indication than the match with the correct pronunciation. If the utterance matches one of the competition models, process 130 signals 140 an incorrect pronunciation. If the utterance does not match the competition models, process 130 signals 142 a correct pronunciation.

Figure 9:
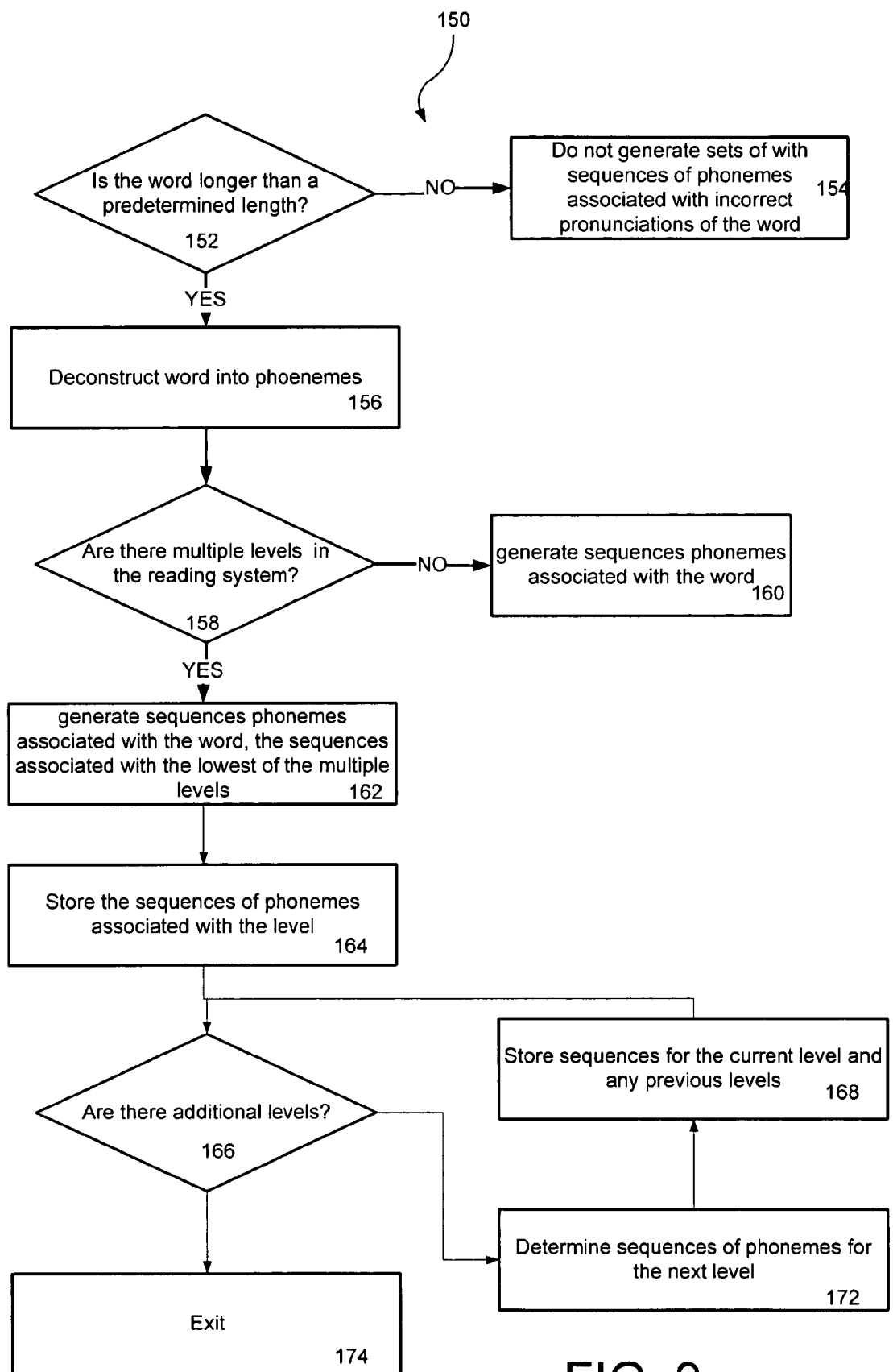
FIG. 9 is flow chart depicting a process for generating word competition models.

Referring to FIG. 9, a process 150 for generating and associating competition models with multiple levels of a reading fluency program is shown. Process 150 includes determining if a word in a passage is longer than a predetermined length. The predetermined length can be based on the number of letters, the number of syllables, or the number of phonemes in the word. If the word is not greater than the predetermined length process 150 does not generate a set of competition models. If the word is greater than the predetermined length, process 150 decomposes the word into a sequence of phonemes. Process 150 determines 158 if there are multiple reading levels in the system. If there are not multiple levels (i.e., there is a single level), process 150 generates and stores 160 combinations of phonemes representative of competition models for the word. If there are multiple levels, process 150 generates 162 and stores 164 combinations of phonemes representative of competition models for the word for the lowest or easiest of the multiple levels. Process 150 subsequently determines if there are additional levels, and if there are additional levels determines 172 competition models associated with the next level. Process 150 stores the competition models for the current level in addition to the competition models for any previous levels. Steps 166, 172, and 168 are repeated until there are no additional levels and the process exits 174.

A number of embodiments of the invention have been described. Nevertheless, it will be understood that various modifications may be made without departing from the spirit and scope of the invention. For example, the system can provide support to people who speak different languages. The system can have a built in dictionary that will give textually appropriate definition of what a word means, and can give it in English and a user's native language. Accordingly, other embodiments are within the scope of the following claims.

What is claimed is:

1. A computer implemented method for recognizing speech patterns, the method comprising:
segmenting a word into a string of consecutive phonemes;
storing a plurality of sequences of the phonemes, at least one of the sequences of phonemes being associated with a mispronunciation of the word;
associating a correctness indication with at least some of the sequences of the phonemes;

providing a plurality of levels, at least some of the levels having multiple sequences of the phonemes associated with the level and at least some of the sequences of phonemes being associated with multiple ones of the plurality of levels with the correctness indication varying based on the level;

comparing, by a computer system, an utterance with the plurality of sequences of phonemes;

determining, by the computer system, if a match exists between the utterance and a particular one of the sequences of phonemes; and determining, by the computer system, an accuracy of the utterance based on the determined match, the level, and the correctness indication.

2. The method of claim 1 wherein storing the plurality of sequences of the phonemes includes storing a sequence including all the phonemes for the word.

3. The method of claim 1 wherein storing the plurality of sequences of the phonemes includes storing a truncated sequence of phonemes for the word.

4. The method of claim 1 wherein the plurality of levels includes at least one of loose, medium, and strict.

5. The method of claim 1, wherein the sequence of phonemes associated with the mispronunciation of the word comprises a pronunciation that is not recognized as an utterance corresponding to the word.

6. The method of claim 1, wherein the at least one of the sequences associated with the mispronunciation of the word comprises a competition model for the word.

7. The method of claim 1, further comprising:
associating a probabilistic weighting with each of the plurality of sequences of the phonemes.

8. The method of claim 7, wherein:
at least one of the sequences of phonemes is associated with a correct pronunciation of the word, and
associating the probabilistic weighting with each of the plurality of sequences of the phonemes comprises associating a greater probabilistic weighting to at least one of the sequences of phonemes associated with a correct pronunciation of the word than to at least one of the sequences of phonemes associated with the mispronunciation of the word.

9. The method of claim 1, wherein storing a plurality of sequences of the phonemes comprises storing at least one sequence of phonemes omitting at least one phoneme that is preceding a last one of the phonemes in the string and succeeding a first one of the phonemes in the string.

10. A computer implemented method comprising:
segmenting, by a computer system, a word into a string of consecutive phonemes;
generating, by the computer system, sequences of phonemes having at least one omitted phoneme; and
associating a first set of multiple ones of the sequences of the phonemes with a first pronunciation level for the word, the first set of the sequences of the phonemes being associated with mispronunciations of the word for the first pronunciation level;
associating a second set of multiple ones of the sequences of the phonemes with a second pronunciation level for the word, the second set of the sequences of the phonemes being associated with mispronunciations of the word for the second pronunciation level and being different from the first set of sequences of phonemes associated with the first level.

11. The method of claim 10 further comprising:
associating a third set of multiple ones of the sequences of the phonemes with a third pronunciation level for the word, the third set of the sequences of the phonemes being associated with mispronunciations of the word for the third pronunciation level and being different from the first and second sets of sequences of phonemes associated with the first level and the second level;
wherein the first pronunciation level comprises a loose pronunciation level,
the second pronunciation level comprises a medium pronunciation level, and
the third pronunciation level comprises a strict pronunciation level.

12. The method of claim 10 wherein the first and second pronunciation levels are based on pronunciation of the words.

13. The method of claim 10 wherein the sequences of phonemes includes a truncated sequence of phonemes for the word.

14. The method of claim 10 wherein the words include at least 3 phonemes.

15. The method of claim 10, wherein the sequence of phonemes associated with the mispronunciation comprises a pronunciation not recognized as an utterance corresponding to recognition of the word.

16. The method of claim 10, wherein the at least one of the sequences associated with the mispronunciation of the word comprises a competition model for the word.

17. The method of claim 16, further comprising storing a complete sequence of the phonemes, the complete sequence being associated with a correct pronunciation of the word.

18. The method of claim 10, further comprising:
associating a probabilistic weighting with each of the plurality of sequences of the phonemes.

19. The method of claim 18, wherein:
at least one of the sequences of phonemes is associated with a correct pronunciation of the word, and
associating the probabilistic weighting with each of the plurality of sequences of the phonemes comprises associating a greater probabilistic weighting to at least one of the sequences of phonemes associated with a correct pronunciation of the word than to at least one of the sequences of phonemes associated with the mispronunciation of the word.

20. A speech-recognizing device configured to:
segment a word into a string of consecutive phonemes;
store a plurality of sequences of the phonemes, at least one of the sequences being associated with a mispronunciation of the word and omitting at least one phoneme that is preceding a last one of the phonemes in the string and succeeding a first one of the phonemes in the string;
associate a correctness indication with at least some of the sequences of the phonemes;
provide a plurality of levels wherein the correctness indication varies based on the level, at least some of the levels having multiple sequences of the phonemes associated with the level and at least some of the sequences of phonemes being associated with multiple ones of the plurality of levels with the correctness indication varying based on the level;
compare an utterance with the plurality of sequences of phonemes;
determine if a match exists between the utterance and a particular one of the sequences of phonemes; and
determine an accuracy of the utterance based on the determined match, the level, and the correctness indication.

21. The speech-recognizing device of claim 20 further configured to store a sequence of all the phonemes for the word.

22. The speech-recognizing device of claim 20 further configured to store a truncated sequence of phonemes for the word.

23. A device configured to:
- segment a word into a string of consecutive phonemes;
- generate sequences of phonemes having at least one omitted phoneme; and
- associate a first set of multiple ones of the sequences of the phonemes with a first pronunciation level for the word, the first set of the sequences of the phonemes being associated with mispronunciations of the word for the first pronunciation level;
- associate a second set of multiple ones of the sequences of the phonemes with a second pronunciation level for the word, the second set of the sequences of the phonemes being associated with mispronunciations of the word for the second pronunciation level and being different from the first set of sequences of phonemes associated with the first level.

24. The device of claim 23 wherein the first and second pronunciation levels are based on pronunciation of the words.

25. The device of claim 23 wherein the sequences of phonemes includes a complete sequence of phonemes for the word.

26. The device of claim 23 wherein the sequences of phonemes includes truncated sequence of phonemes for the word.

27. A computer program product, tangibly embodied in an information carrier, for executing instructions on a processor, the computer program product being operable to cause a machine to:
- segment a word into a string of consecutive phonemes;
- store a plurality of sequences of the phonemes, at least one of the sequences being associated with a mispronunciation of the word;
- associate a correctness indication with at least some of the sequences of the phonemes;
- provide a plurality of levels, at least some of the levels having multiple sequences of the phonemes associated with the level and at least some of the sequences of phonemes being associated with multiple ones of the plurality of levels with the correctness indication varying based on the level;
- compare an utterance with the plurality of sequences of phonemes;
- determine if a match exists between the utterance and a particular one of the sequences of phonemes; and
- determine an accuracy of the utterance based on the determined match, the level, and the correctness indication.

28. The computer program product of claim 27 further comprising instructions to cause a machine to store a sequence of all the phonemes for the word.

29. The computer program product of claim 27 further comprising instructions to cause a machine to store a truncated sequence of phonemes for the word.

30. The computer program product of claim 27 further comprising instructions to cause a machine to store a sequence of phonemes omitting at least one phoneme that is preceding a last one of the phonemes in the string and succeeding a first one of the phonemes in the string.

31. A computer program product, tangibly embodied in an information carrier, for executing instructions on a processor, the computer program product being operable to cause a machine to:
- segment a word into a string of consecutive phonemes;
- generate sequences of phonemes having at least one omitted phoneme; and
- associate a first set of multiple ones of the sequences of the phonemes with a first pronunciation level for the word, the first set of the sequences of the phonemes being associated with mispronunciations of the word for the first pronunciation level;
- associate a second set of multiple ones of the sequences of the phonemes with a second pronunciation level for the word, the second set of the sequences of the phonemes being associated with mispronunciations of the word for the second pronunciation level and being different from the first set of sequences of phonemes associated with the first level.

32. The computer program product of claim 31 wherein the first and second levels are based on pronunciation of the words.

33. The computer program product of claim 31 wherein the sequences of phonemes includes truncated sequence of phonemes for the word.

* * * * *

UNITED STATES PATENT AND TRADEMARK OFFICE
CERTIFICATE OF CORRECTION

PATENT NO. : 7,624,013 B2 Page 1 of 1
APPLICATION NO. : 10/938749
DATED : November 24, 2009
INVENTOR(S) : Simon Barker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1316 days.

Signed and Sealed this

Fourteenth Day of December, 2010

David J. Kappos
*Director of the United States Patent and Trademark Office*